April 24, 1962  F. P. JANKOWSKI  3,031,324
TRANSFER AND METHOD OF MAKING THE SAME
Filed April 16, 1958  3 Sheets-Sheet 1

INVENTOR.
Frank P. Jankowski
BY
Louis O. French
Atty.

April 24, 1962 F. P. JANKOWSKI 3,031,324
TRANSFER AND METHOD OF MAKING THE SAME
Filed April 16, 1958 3 Sheets-Sheet 2

INVENTOR.
Frank P. Jankowski
BY Louis O. French
Atty.

April 24, 1962 F. P. JANKOWSKI 3,031,324
TRANSFER AND METHOD OF MAKING THE SAME
Filed April 16, 1958 3 Sheets-Sheet 3

INVENTOR.
Frank P. Jankowski
BY
Louis O. French
Atty.

United States Patent Office 3,031,324
Patented Apr. 24, 1962

3,031,324
TRANSFER AND METHOD OF MAKING THE SAME
Frank P. Jankowski, 214 E. Detroit St., Milwaukee, Wis.
Filed Apr. 16, 1958, Ser. No. 728,811
1 Claim. (Cl. 117—3.1)

The invention relates to a new form of transfer of the applique or label type and to a method of making the same, said transfer embodying designs, motifs, letters, pictures, or any image and which after making as hereinafter described can be readily applied to garments, objects, or surfaces by the use of adhesives (thermal, water, or pressure types) with which it is provided.

One object of the invention is to provide a method for making transfers of the type above described that eliminates material costs, die cost, and die-cutting costs of the usual methods so that the product can be produced at a low cost.

A further object of the invention is to provide a method of making transfers that requires very little handling of the finished product and low packaging costs and one that permits the forming of more intricate shapes and designs than can be produced by dies.

A further object of the invention is to provide a transfer of the type above described that may be readily applied by heat, water, or pressure transfer to the receiving surface and because it may be made thinner than the usual die cut transfers will firmly adhere to this surface without a tendency to peel off when encountering obstructions.

This application is a continuation in part of my copending application Serial No. 657,891, filed May 8, 1957, and now abandoned, for Transfer and Method of Making the Same, and in addition to the above named objects has for an object to use a multiple screen in the method so as to secure a thicker coating for each application than has heretofore been possible with the usual printing screen and has for another object the spaced slitting or cutting of the backing sheet on which a number of transfers are made in the carrying out of my method so that any one or more of these transfers may be removed from this backing release sheet on and with a portion of the release and backing support sheet surrounding the same to facilitate the sale of said transfers and their preservation in their original condition by the buyer or user until such time as the user may want to use them.

A further object of this invention is to simplify the method of making transfers where a decorative material such as flock is used by a single application of white colored flock, and thereafter this white flock surface or a portion thereof is dyed to conform to the desired decorative design by screen printing thereon textile lacquers or dyes of one or more different colors so that in the finished design the decorative flock surface appears in different colors that may provide an interior design configuration of letters, lines, or figures. In this connection where the adhesive base coating is a theromosensitive one, the dye or dyes used to color the flock is preferably one which becomes set under the application of heat so that the heating of the transfer to effect its adhesion to the surface to be decorated also sets the dye or dyes.

There are unlimited applications for my method of making transfers which will become apparent from the subsequent detailed description and by which many types of finishes can be used to simulate fabric, paint, reflective, sparkling, frosted, or other desirable effects.

The invention further consists in the steps of the method and the new product hereinafter described and more particularly defined by claims at the conclusion hereof.

In the drawings:

FIG. 1 is a side elevational view of a release sheet to be printed on;

In the method described herein for effecting the production of the applique or transfer, I find the most practical way of building up the desired design is by what is commonly known as the silk screen process of printing, the screen being either of wire, silk, or nylon of the desired mesh but preferably modified as hereinafter described to increase the depth or thickness of each coating. In accordance with this known process, the design, letters, pictures, image, or other matter to represent the subject of the transfer is photographically reproduced on the photo-sensitive emulsion applied to the printing screen to provide a printing negative.

In the subsequent description the term "design" will be used to designate the subject matter of the transfer, whether it be a fanciful design, letters, pictures, images, etc.

Figure 1:
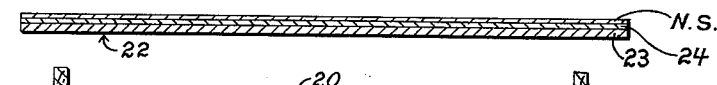
Figure 2:
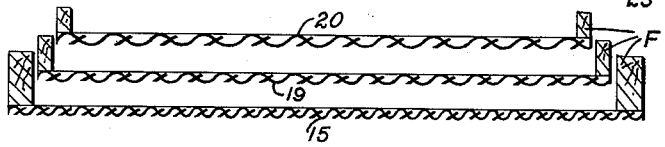
FIG. 2 is a composite sectional view of the screens used in an improved printing screen structure.
Figure 2A:
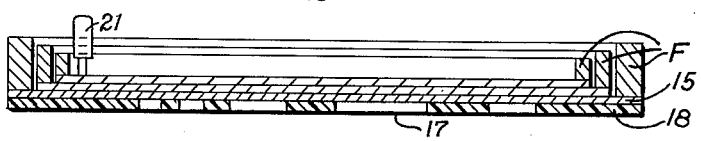
FIG. 2A is a vertical sectional view through the assembled printing screen structure.
Figure 3:
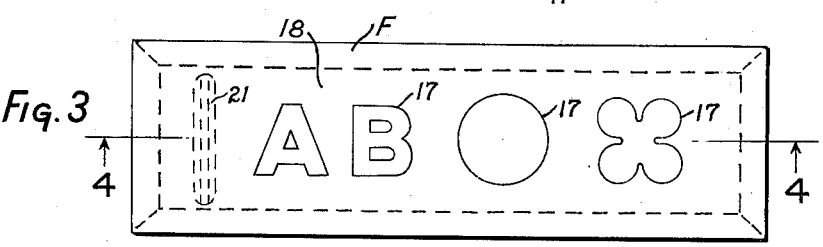
FIG. 3 is a bottom plan view of the printing screen and a coating spreader.

As a working tool or apparatus for the process I use a design treated screen 15 mounted on the usual frame 16 and carrying on its front face the design to be reproduced created by the treatment of the emulsion applied to said face to leave open spaces 17 (to form the design) and the set emulsion faces 18 (to form the blanked out background for the design). It was found in practice with this screen alone that only very thin coatings could be obtained, for example, about one-quarter of a thousandth of an inch, so that many coatings of a given material would have to be applied to bring it up to the desired thickness. After considerable experimenting, it has been found that when one or more plain screens of progressively coarser mesh are superimposed one above the other on the screen 15, a depth of coating of single coating is increased from four to five times that possible with the screen 15 alone, and as a result I now use as a printing screen structure the design treated screen 15, a plain screen 19 of coarser mesh than the screen 15 and superimposed over the top surface of the same, and preferably another plain screen 20 of coarser mesh than the screen 19 superimposed over the screen 19, the screens being shown as separate units in FIG. 2 and as an assembled screen structure in FIG. 2A in which the frames F for superimposed screens nest progressively into each other. With this construction when a coating material is applied to the top of this screen structure and a manually operated spreader 21 or a similar power operated spreader is used to spread and force the coating material through the screen structure, during this operation coating material trapped between the screens is carried down onto the surface to be treated to increase the thickness of a coating, the screens which are somewhat elastic co-acting with each other to help force material above the screen 15 through this screen under action of the spreader.

For receiving the coating material from the screen I use what I term a release sheet 22. This release sheet may have its body portion 23 formed of paper or suitable plastic, but for economical reasons the body is a relatively stiff paper. One side of this body has a coating 24 applied thereto that is impervious to moisture and impervious to or unaffected by the adhesives that may be used in the formation of the transfer so that the completed transfer may be readily stripped therefrom. One form of coating which I find works well in practice is polyethylene, though other coating materials having the above mentioned characteristics may be used without departing from my invention. Upon the top of the coating 24 I preferably apply a very thin film NS of a static prohibitor such as AR–Double Strike Anti-Static Compound, produced by Illinois Research Laboratories, of Chicago, Illinois, so that dirt, excess flock, or other matter will not adhere to this sheet and may be readily removed by a suction device. This non-static film does not effect the application of the coatings hereinafter described.

Figure 4:
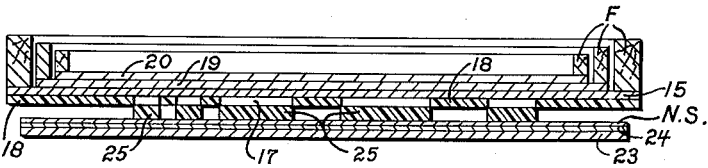
FIG. 4 is a vertical sectional view taken on the line 4—4 of FIG. 3 showing the application of a first coating.

As the first step in my method, the design treated face of the screen 15 is brought into contact with the coated face 24 of the release sheet 22 so that faces 18 of the emulsion layer of the screen bear on the top face of the coating NS. Then a coating, or mass, of the first coating material is deposited on the top side of the screen 20 and worked through the screens 20, 19, and 15 by the spreader 21 so that it fills the open spaces 17 with design coatings 25 as indicated in FIG. 4. This first coating is a suitable adhesive that may be either a thermosetting adhesive, a water activated adhesive, or a pressure sensitive adhesive. For a thermosetting adhesive I use a cellulose acetate vinyl resin to which I may preferably add a small amount of rubber cement and a small amount of paraffin wax, or a polyvinyl chloride-acetate resin having eighty-five percent of the chloride and fifteen percent of the acetate together with a plasticizer, such as vioctyl phthalate or other suitable plasticizer, and a "Versamid" gum resin, such as General Mills "Versamid 930," to secure sharp demarcation in printing, in the amounts of seventy percent of the first named resin, twenty percent of the plasticizer, and ten percent of the gum resin, the gum resin being mixed with a small amount of alcohol. A water soluble polyvinyl alcohol may be used as a water sensitive adhesive, and any suitable normally tacky adhesive such as rubber base pressure sensitive adhesive, for example, those used on known pressure sensitive tapes, may be used as a pressure sensitive adhesive. After this adhesive coating has been applied to the release sheet, the coated sheet is separated from the screen and the adhesive allowed to dry.

It is to be noted that on the removal of the coated sheet from the screen, not only the coating in the spaces 17 but also coating in the interstices of the screens 15, 19, and 20 is brought down to form the complete coating layer so that the thickness of the applied coating is determined by the thickness of the emulsion deposited on the screen 15 and approximately the thickness of all the screens 15, 19, and 20 and their intervening spaces. In practice this enables me to deposite a coating on the release sheet of about one-thousandth of an inch for each printing by the screen. This thickness of coating is sufficient where the adhesives are pressure sensitive and/or water sensitive, though in some instances two coating applications of water sensitive adhesives may be used to form the adhesive material layer of the transfer, but in the case of the thermosetting adhesive since it is desirable to provide a sufficient thickness of the adhesive to allow it to penetrate into the body of the material such as cloth or other textiles to which it is to be attached, at least three coatings of this adhesive are successively applied by the application of the screen as described above with a drying of each coat before applying the next to form the layer of adhesive material.

The sheet as shown in FIG. 4 with the layer of dried adhesive material 25 thereon is next brought into printing contact with the screen 15 for the application of a layer of body coating material thereto by the use of a screen identical with the screen first described, and a coating or mass of this body material is deposited upon the top face of the screen 20 and worked through this and the other screens 19 and 15 by the spreader 21 so that it again fills the open spaces 17 with design coatings 26 that are deposited upon the previously deposited adhesive coatings 25. This second coating material is a body coating that may impart strength to the label and is preferably any suitable plastic, such as a vinyl plastic, preferably a polyvinyl chloride-acetate resin (of ninety percent chloride and five percent acetate) in the amount of fifty percent of the total amount, with a suitable plasticizer, such as dioctyl phthalate in the amount of twenty percent, and a butadiene-acrylonitrile rubber copolymer in the amount of twenty-five percent and "Versamid" gum resin, for example, General Mills "Versamid 930" in the amount of five percent, the "Versamid" resin being mixed with a small amount of alcohol.

Figure 7:
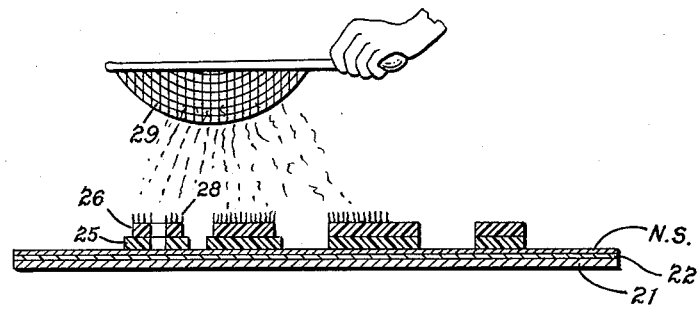
FIG. 7 is a side view showing the application of decorative material to the sheet shown in FIG. 5.
Figure 8:
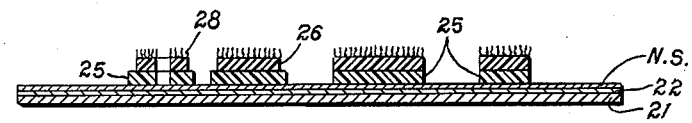
FIG. 8 is a vertical sectional view taken on the line 8—8 of FIG. 6.
Figure 9:
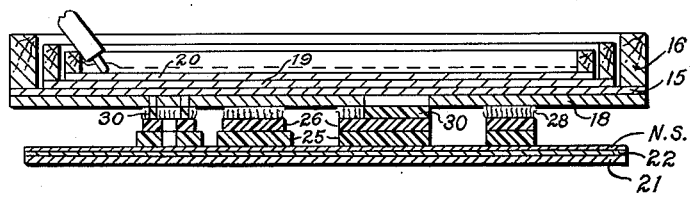
FIG. 9 is a view similar to FIG. 5 showing another coating being applied to the sheet shown in FIGS. 6 and 8.
Figure 12:
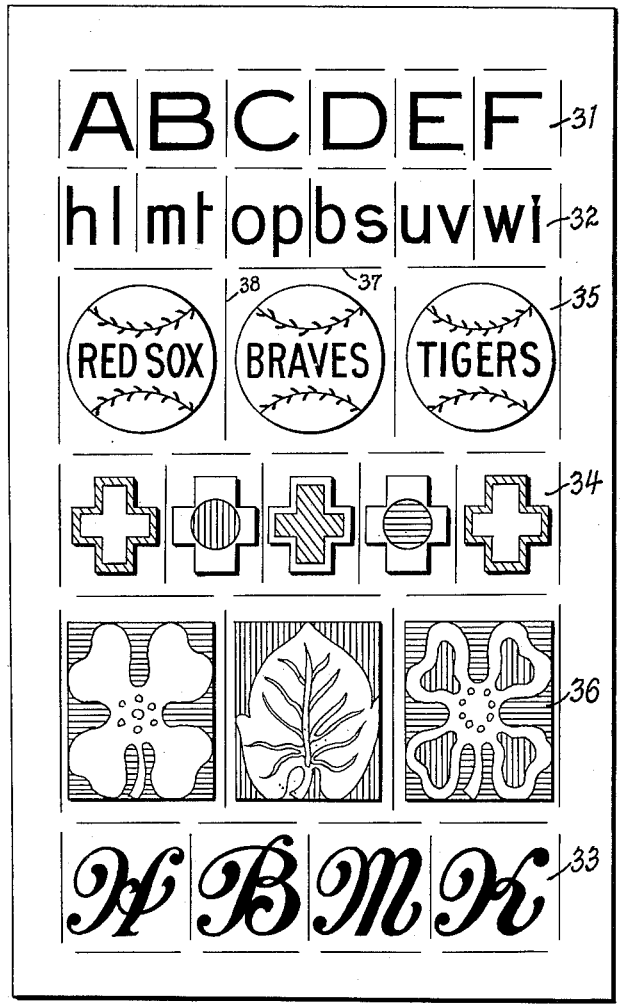
FIG. 12 is a plan view of a sheet of appliques as made under the method of this invention and prepared for sale to the user.

If more than one body coat is desired, these coatings may be similarly applied with drying between coatings to form the body layer of body material. Preferably at least two coatings are applied, and where the label is to provide a colored surface, the first coating includes a coloring medium, such as a small amount of a ground pigment of the color desired. The second coating is a clear coating and is transparent so that the color in the first coating is visible. This color provides a colored background for the decorative material coating hereinafter described. This body layer should have a tacky characteristic so that directly after the second coat is applied, a decorative coating 28 may be applied to the exposed surface of the design coatings 26 as shown in FIG. 8. This may be done as shown in FIG. 7 by shaking the decorative coating material from a sieve 29 or other suitable means while the release sheet is being vibrated by any suitable form of vibrator or flocking apparatus (not shown). The decorative material may be a wool, cotton, or rayon flock which when applied to the plastic design coating forms a suede surface to simulate fabric, or it may be glass beads, bronze powder, or other decorative material. For some designs, such as letters or words, the flock is generally a colored flock of the same color as the pigment above noted in the body coating, and these all one color designs are shown in columns 31, 32, and 33 of FIG. 12.

Where the design is to include interior decorative features or be in contrasting colors, a design coating is then applied by screen printing in as many colors as desired as indicated in FIG. 9 by the coating or coatings 30 forming the desired surface design and some of which are shown in columns 35, 34, and 36 in FIG. 12. Where the design has a decorative flock coating, the final design coating can be a dye or dyes or a textile lacquer of the desired color or colors. Where dyes are used and the transfer has a thermosetting adhesive coating, the dyes are preferably of the type in which the colors become set on the application of heat so that the heat used in attaching the transfer to an object or surface may be used to set the color of the dye. Where the decorative material is glass beads, no extra coat is applied but the coloring medium in the body coating as previously noted is used to impart a coloring to the beads if the same are transparent.

Figure 5:
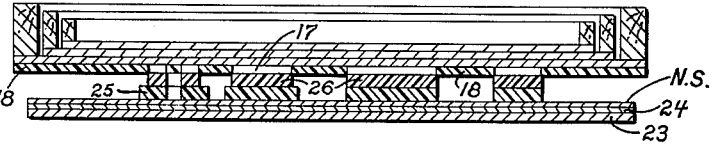
FIG. 5 is a vertical sectional view similar to FIG. 4 showing the application of a second coating.
Figure 6:
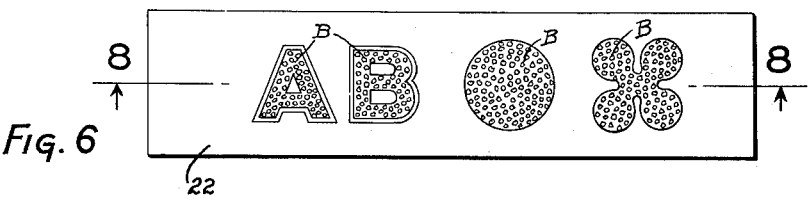
FIG. 6 is a plan view of the printed release sheet after the two layers of the coating materials and decorative material have been applied thereto.
Figure 10:
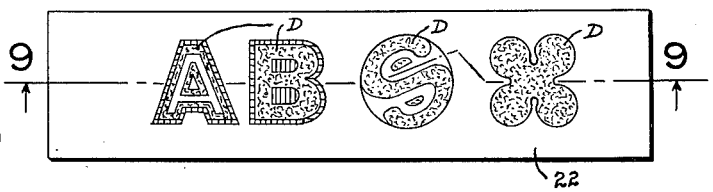
FIG. 10 is a plan view of a finished sheet.

FIG. 6 shows different designs on a release sheet in which the top decorative coatings are glass beads B, and in which for artistic effect the body layer that receives the beads is marginally spaced from the bottom layer, and FIG. 5 shows that the screen 15 is adapted to provide this marginal spacing. FIG. 10 shows different designs D on a release sheet in which the decorative coatings are flock with decorative coatings.

It is to be noted that the drawings in FIGS. 4, 5, and 9 show the last coating as below the screen since in actual practice after the squeegee presses over the screens and tends to depress the screens, the screens on release raise so that the figures show the coating after it has been applied.

It is also to be noted that each additional film or coating of the adhesive and body layers softens up the preceding coatings so that the final built up product is an integral mass.

Figure 11:
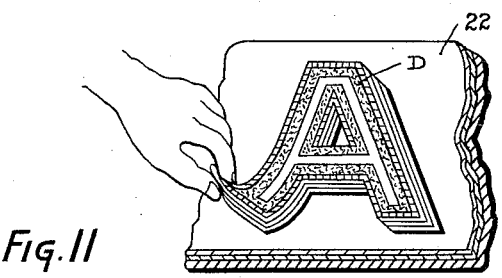
FIG. 11 is a perspective view showing how the finished applique or label is removed from its release backing.

After drying, the applique or transfer thus formed on the release sheet, as shown for example in FIG. 12, is ready for packaging as a sheet material. These sheets before shipping to retailers are spaced slitted or cut by horizontal spaced cuts 37 and vertical cuts 38 so that the rows of these designs may be separately displayed, if desired, and individual components of these rows may be separated and delivered to the purchaser on a portion of the original release sheet. On receiving the design coated release sheet, the user can readily peal off the design, applique, or transfer from the release sheet as indicated in FIG. 11 showing one of the designs shown in FIG. 10 and apply it to the receiving surface such as a garment or other cloth surface, an object, or wood, glass, or other surfaces desired to be decorated or lettered.

In FIG. 12 I have shown a number of different types of designs made in accordance with this method. The letters in the columns 31 and 32 and the notations Red Sox Braves Tigers are those in which the dyed flock has been applied to the body layer of the basic design. The baseball designs in column 35 represent designs in which a white or gray flock is used as a decorative material upon which is superimposed the additional printed matter shown. The designs shown in columns 34 and 36 are of the type having the flock as a decorative surface placed on the top body layer of a white color which on the printing by the dyes or layers is given different colors as indicated by the coloring in these designs. Also there is indicated in column 36 interior designs produced by this final screen printing step.

Where the adhesive is thermosetting, the finished applique may be applied to a garment by placing it adhesive side down, and applying a heated iron to its top face to activate the adhesive so that it will penetrate and adhere to the garment material, at the same time setting the dye or dyes, if used, to bring out interior design features such as indicated in columns 35, 36, and 34 of FIG. 12. If the adhesive used is water activated, this adhesive side is moistened by a damp cloth or sponge and then brought into contact with the receiving surface. If the adhesive is a pressure responsive or tacky adhesive, then this adhesive side is brought into contact with the receiving surface, and pressure is applied by the fingers or otherwise to smooth the transfer down and force out any air bubbles.

With the above described process, a transfer of the applique or label type is obtained that can be quickly and easily applied and that may be made lighter, thinner, and cheaper than the usual die-cut transfers and that when once applied will not tend to peal off if it comes into contact with obstructions or may be made in any thickness desired.

It is to be noted that all of the coatings heretofore mentioned making up the applique or label have flexible or pliable characteristics to permit the removal of the transfer from the release sheet as shown in FIG. 11 and its application to the surface to which it is to be applied.

I desire it to be understood that this invention is not to be limited to any particular details herein described except in so far as such limitations are included in the claim.

What I claim as my invention is:

The method of making a transfer of the applique or label type which consists in taking a release sheet having a relatively stiff paper body and a moisture proof and adhesive resistant receiving surface thereon; second, taking a first screen having a photosensitized emulsion thereon of the desired design on one face thereof and superimposing on the opposite side of said first screen a plain second screen of a coarser mesh than said first screen and superimposing on the top of the second screen a plain third screen of a coarser mesh than said second screen, all of said screens being in facial contact; third, depositing onto the coated release sheet by successive coatings forced through said superimposed screens and in the form of the desired design on the first screen, a layer of an adhesive resin material and then layers of resin plastic body material having tacky characteristics and finally, applying a decorative material on the top of the last layer.

References Cited in the file of this patent

UNITED STATES PATENTS

| | | |
|---|---|---|
| 1,211,455 | Kotter et al. | Jan. 9, 1917 |
| 1,710,309 | Grupe | Apr. 23, 1929 |
| 2,190,210 | Kaber | Feb. 13, 1940 |
| 2,283,480 | Wilkerson | May 19, 1942 |
| 2,374,524 | Bowers | Apr. 24, 1945 |
| 2,429,986 | Bowers | Nov. 4, 1947 |
| 2,469,671 | Warde | May 10, 1949 |
| 2,536,420 | Burdick | Jan. 2, 1951 |
| 2,558,804 | Wittgren | July 3, 1951 |
| 2,646,364 | Porth | July 21, 1953 |
| 2,717,842 | Vitalis | Sept. 13, 1955 |